(12) United States Patent
Holbrook

(10) Patent No.: US 6,974,545 B1
(45) Date of Patent: Dec. 13, 2005

(54) METHOD FOR TREATING A WORK MATERIAL

(75) Inventor: Donald D. Holbrook, Fresno, CA (US)

(73) Assignee: Ag Formulators, Inc., Fresno, CA (US)

( * ) Notice: Subject to any disclaimer, the term of this patent is extended or adjusted under 35 U.S.C. 154(b) by 0 days.

(21) Appl. No.: 09/511,830

(22) Filed: Feb. 23, 2000

(51) Int. Cl.[7] ............................................. C02F 1/00
(52) U.S. Cl. ..................................... 210/749; 210/757
(58) Field of Search ................................ 210/749, 757

(56) References Cited

U.S. PATENT DOCUMENTS

| | | | |
|---|---|---|---|
| 4,035,470 A | | 7/1977 | Senjo et al. |
| 4,332,687 A | | 6/1982 | Daignault et al. |
| 4,416,786 A | | 11/1983 | Knorre et al. |
| 4,584,107 A | | 4/1986 | Odaka et al. |
| 4,778,519 A | * | 10/1988 | Pesic |
| 5,211,809 A | | 5/1993 | Naddeo et al. |
| 5,269,943 A | | 12/1993 | Wickramanayake |
| 5,466,374 A | | 11/1995 | Bachhofer et al. |
| 5,500,125 A | | 3/1996 | Horn et al. |
| 5,700,375 A | | 12/1997 | Hagen et al. |
| 6,071,417 A | * | 6/2000 | Adachi |

OTHER PUBLICATIONS

Richey et al., "Improved Ozone Quenching With Calcium Thiosulfate", Oct. 2000.*
Thomas Grosvenor, Ozonation By-Products In Drinking Water, pp. 30-33; 39, Feb. 1999, Water Engineering & Management.
Masahiro Takizawa, Akitsugu Okuwaki & Taijiro Okabe, The Chemical Behavior Of Low Valence Sulfur Compounds. VIII The Oxidation Of Sodium Thiosulfate With Ozone, pp. 3785-3789, Dec. 1973, Bulletin Of The Chemical Society Of Japan, vol. 46.

* cited by examiner

Primary Examiner—Betsey Morrison Hoey
(74) Attorney, Agent, or Firm—Worrel & Worrel

(57) ABSTRACT

A method for treating a work material containing a target constituent, including the steps of presenting the work material for treating in accordance with the method; and applying a treating agent to the work material operable to treat the work material to render substantially harmless the target constituent in the work material.

6 Claims, 1 Drawing Sheet

METHOD FOR TREATING A WORK MATERIAL

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a method for treating a work material and, more particularly, to such a method which has particular utility in the treatment of target constituents such as maybe borne by water and the like.

2. Description of the Prior Art

The treatment of work materials of a wide variety of types for the purpose of rendering of them for use suitable in specific manners and for specific purposes is, of course, at least as old as recorded human history. Since one of the necessities of life for human beings, as well as virtually all other creatures, is the consumption of water, the availability of an access to water constitutes one of the earliest examples of such material treatment. In addition to its necessity as a life sustaining substance, water has also long been known for usage for a host of different purposes including only by way of example, transportation, energy, material processing, and a wide assortment of other usages. In the case of water, used for any such desired purpose, the water must, in many instances, be rendered suitable for the prescribed usage.

The most critical requirements for any specified usage of water or the like is, of course, for human consumption. Thus, it has long been known to treat water in a range of volumes from small quantities to enormous quantities to render the water suitable for human consumption, as well as other usages requiring similarly critical parameters. The treatment required for the water received, of course, is dependent upon the source and condition of the water involved. In some instances the source of the water involved is suitable as received and requires no such treatment. In many, or most, other circumstances the water requires treatment for various purposes.

One of the most common requirements for treating water to render it suitable for human consumption is to disinfect the water to avoid contaminants of a wide variety of types. A relatively common method for accomplishing this purpose, in many areas of the world including the United States, is to employ ozone in the treatment of the water received for the disinfection of the water prior to release for the desired human consumption. Ozone has been found desirable for this purpose in that it also efficiently treats ground waters containing significant amounts of iron, manganese, nitrite ion and hydrogen sulfide. Ozone is additionally desirable in that it does not produce some by-products and in that it does not, in itself, introduce undesirable substances into the resultant water.

However, the use of ozone for this purpose does contribute to a number of side effects or conditions which detract from its practically for use. For example, any ozone gas produced in the treatment operation cannot be vented to the atmosphere, but must be removed requiring extensive equipment for the purpose, more particularly catalytic quenchers. Furthermore, the excess ozone which is dissolved in the treated water must be quenched to avoid corrosion after release from the treatment facility and to allow further down stream treatment such as clorination to be accomplished at the desired level prior to distribution to the public. The most common prior art means for treating such excess ozone is the use of sodium bisulfite which, itself, possesses a number of disadvantageous side effects such as the venting of sulfur dioxide gas. Accordingly, with the use of sodium bisulfite, a variety of types of processing systems are required to handle the by-products produced therefrom. There are additional questions regarding sulfites which may accidentally be released, collect, and otherwise contribute toward health hazards and other side effects of undesirable character.

Therefore, it has long been known that it would be desirable to have a method for treating a work material which was capable effectively of treating a target constituent of the work material substantially without the production of undesirable side effects; which had particular utility in the treatment of such work materials as water received from available sources in conditions which do not permit, without treatment, usage for the prescribed purpose; which was adaptable for usage in the treatment of such water received in a range of volumes from relatively small quantities to massive quantities such as may be involved in commercial or municipal usages; which had particular utility in permitting ozone to be employed in the treatment of such water rendering it suitable for human consumption and other usages, while substantially eliminating the undesirable side effects of the use of such ozone; which was widely adaptable for usage in the treatment of a variety of work materials including, by way of example, water treatment systems of a wide variety of types; and which was otherwise entirely successful in achieving its operational objectives.

BRIEF SUMMARY OF THE INVENTION

Therefore, it is an object of the present invention to provide an improved method for treating a work material.

Another object is to provide such a method which is widely adaptable for usage in a wide variety of specific embodiments and in a wide variety of environments as applied to a multiplicity of work materials.

Another object is to provide such a method which is inexpensive and dependable in use while producing substantially no disadvantageous side affects.

Another object is to provide such a method which has particular utility in the treatment of water received from a wide variety of sources and in an otherwise unacceptable form for consumption by human beings and other forms of life.

Another object is to provide such a method which has particular utility when adapted to usage in waste water treatment systems such as used by municipalities, industries and other waste water treatment systems.

Another object is to provide such a method which avoids the use of secondary systems to recover or contain any by-products produced in the use of conventional methods for such treatment.

Another object is to provide such a method which permits the usage of a variety of forms of treating agent in the practice of the method thereof so as to accommodate to such secondary concerns as availability, cost and the like.

Another object is to provide such a method which, in the preferred embodiment, employs a readily available treating agent which is fully effective in achieving its operational objectives.

Further objects and advantages are to provide an improved method for the purposes described which is dependable, economical and fully effective in accomplishing its intended purposes.

These and other objects and advantages are achieved, in the preferred embodiment of the present invention, in a method for treating a work material containing a target constituent including the steps of presenting the work material for treating in accordance with the method; and applying a treating agent to the work material operable to treat the work material to achieve a predetermined objective relative to the target constituent in the work material.

DETAILED DESCRIPTION OF THE INVENTION

Figure 1:
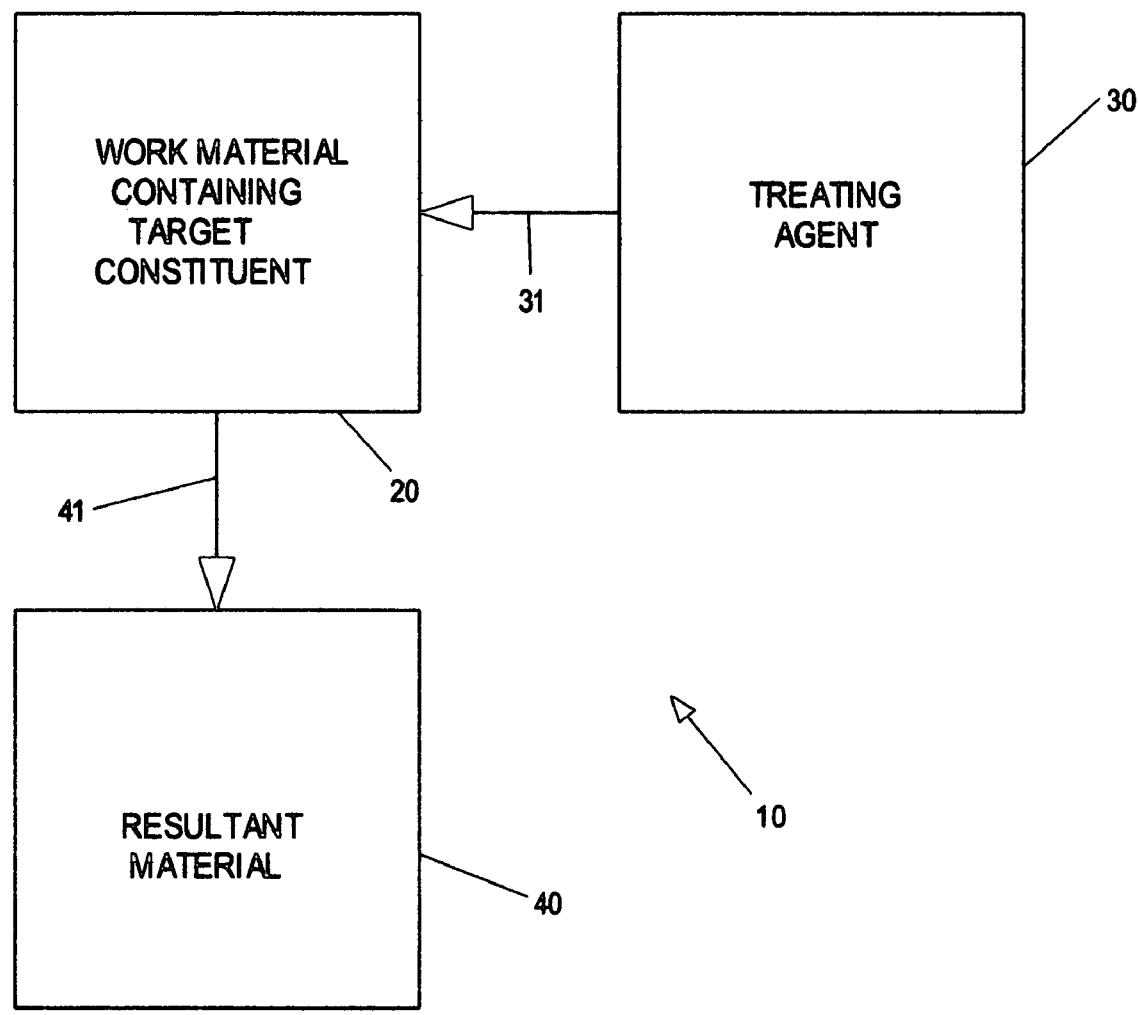
FIG. 1 is a schematic diagram of the method of the present invention.

Referring more particularly to the drawing, the method for treating a work material of the present invention is generally indicated by the numeral 10 in FIG. 1. As shown schematically therein a work material containing a target constituent is generally indicated by the numeral 20. In accordance with the method of the present invention, a treating agent is generally indicated by the numeral 30. An arrow schematically illustrating the application of the treating agent to the work material 20 is indicated by the numeral 31. A resultant material achieved by practice of the method of the present invention is generally indicated by the numeral 40. Arrow 41 indicates the transformation of the work material 20 into the resultant material 40.

The method 10 is adaptable to a wide variety of operative embodiments and environments of use. The particular work material 20 can be of a variety of types including, but not limited to, water such as received by water treatment systems, municipal waste water treatment systems, potable water treatment systems, industrial recycled and waste water treatment systems and the like.

It will be understood that the work material 20 contains a target constituent which, in the illustrative example, is ozone. As previously discussed, ozone is used in the disinfection of drinking water in accordance with conventional practice.

More specifically, in the example of the present invention hereinafter to be discussed it is the excess ozone dissolved in the treated water which is desired to be removed. For illustrative convenience, it will be understood that the ozone has been employed efficiently to treat ground water containing significant amounts of iron, manganese, nitrite ion and hydrogen sulfide. The ozone may create some by-products, as a result of the disinfection process, such as bromine compounds, but does not, in itself, add anything to the end product which is, in the illustrative example drinking water. In addition, the ozone, particularly with increasing usage presents other concerns. For example the ozone gas which is not dissolved in the treated water cannot be vented to the environment and must be removed. Conventionally this is accomplished by converting the ozone to oxygen by catalytic quenchers, by heating, or by passing the ozone through activated carbon filters. In addition, the excess ozone dissolved in the treated water must be quenched to prevent corrosion downstream resulting therefrom and to allow chlorination to the desired level for distribution to water mains.

As previously noted, the most commonly used conventional method for quenching excess ozone in such disinfection systems has been by the use of sodium bisulfite. The typical source for sodium bisulfite is refinery waste which raises questions in and of itself.

The inventor has discovered that ozone quenching in such waters can readily be accomplished without known detrimental side effects using thiosulfate and may include, in particular, calcium thiosulfate, potassium thiosulfate, sodium thiosulfate, or ammonium thiosulfate.

The resultant material 40, in the illustrative example, is water suitable for drinking upon release from the particular water treatment system in which it is employed.

EXAMPLE

The specific example of the practice of the method of the subject invention calls for the use of calcium thiosulfate in solution. While a variety of calcium thiosulfate solutions can be employed, in the illustrative example hereof, calcium thiosulfate solution sold under the trademark CAPTOR® manufactured by Best Sulfur Products in Fresno, Calif., is employed. The particular environment is a drinking water plant receiving water to be processed and containing ozone as the target constituent to be removed, or more specifically, excess ozone in the water to produce suitable drinking water. As discussed, the ozone has been added upstream in the drinking water plant for purposes of disinfection. The excess ozone is to be removed from the water downstream therefrom.

The calcium thiosulfate solution was added to the water passing through the drinking water plant containing the excess ozone to be removed and was applied at the rate of four (4) gallons of CAPTOR® calcium thiosulfate solution per one million (1,000,000) gallons per day of water to be treated. When applied at this rate, it was found that the excess ozone was substantially entirely removed from the water upon release downstream from the drinking water plant.

Experimentation has confirmed that the calcium thiosulfate as well as the resultant material 40 consisting of the resultant drinking water is nontoxic, requires no secondary containment and does not need to be heated in cold weather to prevent crystallization. Furthermore, it does not need insulation or a scrubber in the summer to prevent the release of sulfur dioxide, as is the case in the use of the conventional sodium bisulfite, since no such gases or other by-products are produced.

Tests have revealed that the resultant material, or water, 40 is clear, a neutral solution with a pH of 6.5 to 7.5 and is not corrosive to equipment or damaging in any way to humans or animals. In fact, calcium thiosulfate in the form sold under the trademark CAPTOR® has been used safely in medicine as an antidote for heavy metal and cyanide poisoning. It is believed that even accidental heavy overdosing of the calcium thiosulfate to the water would present no hazard to the public.

Therefore, the method for treating a work material of the present invention is capable effectively of treating a target constituent of the work material substantially without the production of undesirable side effects; has particular utility in substantially without the production of undesirable side effects; has particular utility in the treatment of such work materials as water received from available sources in conditions which do not permit, without treatment, usage for the prescribed purpose; is adaptable for usage in the treatment of such water received in a range of volumes from small quantities to massive quantities such as may be involved in commercial or municipal usages; has particular utility in permitting ozone to be employed in the treatment of such water rendering it suitable for human consumption and other usages, while substantially eliminating the undesirable side effects of the use of such ozone; is widely adaptable for usage in the treatment of a variety of work materials in a variety of operative environments including, by way of example, water treatment systems of a wide variety of types; and is otherwise entirely successful in achieving its operational objectives.

Although the invention has been herein shown and described in what is conceived to be the most practical and preferred embodiment(s), it is recognized that departures may be made therefrom within the scope of the invention which is not to be limited to the illustrative details disclosed.

Having described my invention,

What I claim as new and desire to secure by Letters Patent is:

1. A method for treating a work material containing a target constituent which is substantially ozone comprising the steps of presenting said work material for treating in accordance with said method wherein said work material is water; applying calcium thiosulfate to the water to treat the water; and quenching ozone from the water.

2. The method of claim 1 in which, in said presenting step, the water is passed through a water treatment system and, in said applying step, said calcium thiosulfate is applied directly to the water as it is passed through said water treatment system.

3. The method of claim 2 in which, in the applying step, the calcium thiosulfate is applied directly to the water as it is passed through said water treatment system at the rate of substantially about four (4) gallons of said calcium thiosulfate per one million gallons (1,000,000 gallons) per day of said water.

4. The method of claim 2 wherein, as a result of said applying step, said calcium thiosulfate quenches excess ozone in the water before it passes from the water treatment system substantially without the release of undesirable by-products therefrom.

5. The method of claim 4 in which in said presenting step said water treatment system receives said water in a form which would otherwise be considered undesirable for distribution without treatment by said water treatment system.

6. The method of claim 2 in which, in the applying step, said calcium thiosulfate is applied in an amount sufficient substantially to render harmless said ozone in the water.

* * * * *